March 8, 1938. C. J. KINZIE ET AL 2,110,733
PREPARATION OF A ZIRCONIUM OXYCARBIDE AND SILICON CARBIDE
Filed March 1, 1934 2 Sheets-Sheet 1
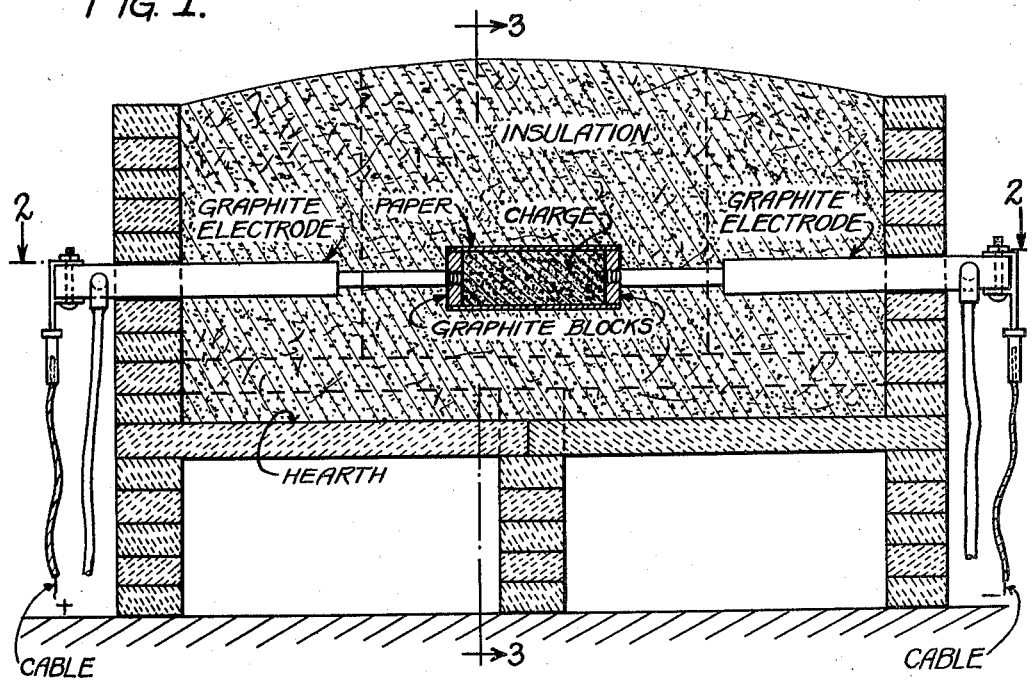
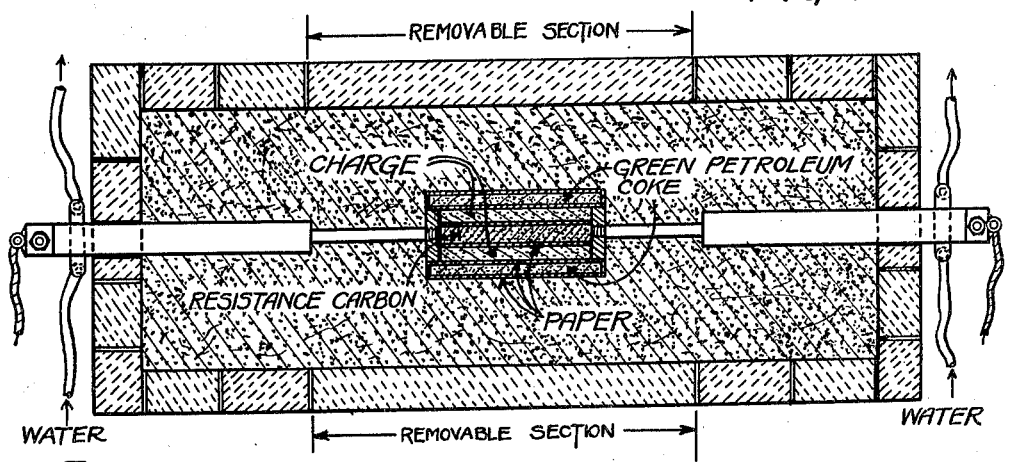
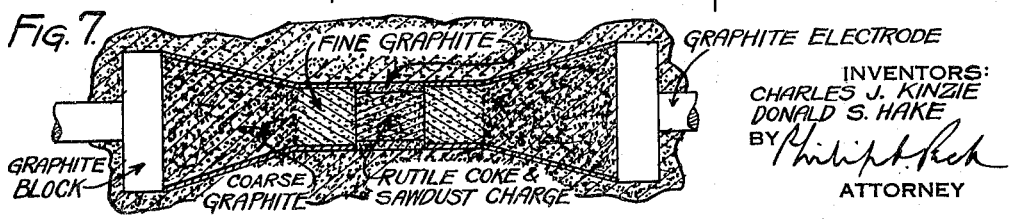
INVENTORS:
CHARLES J. KINZIE
DONALD S. HAKE March 8, 1938.  C. J. KINZIE ET AL  2,110,733
PREPARATION OF A ZIRCONIUM OXYCARBIDE AND SILICON CARBIDE
Filed March 1, 1934   2 Sheets-Sheet 2
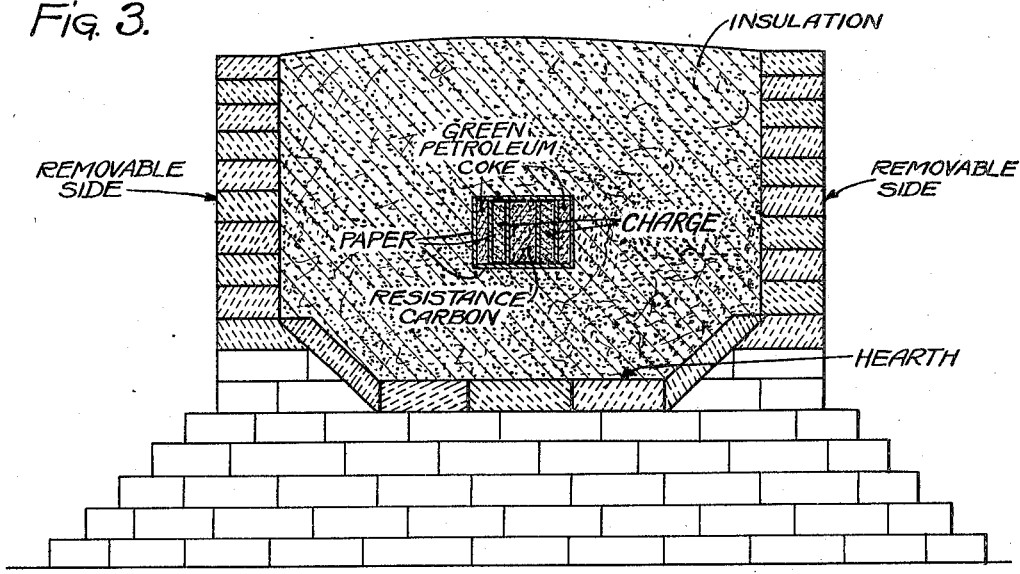
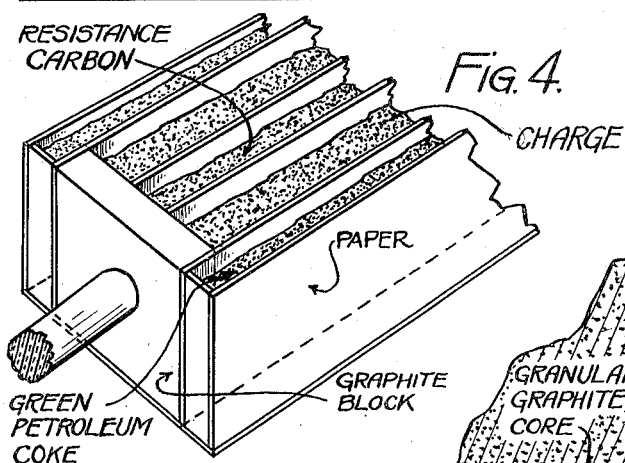
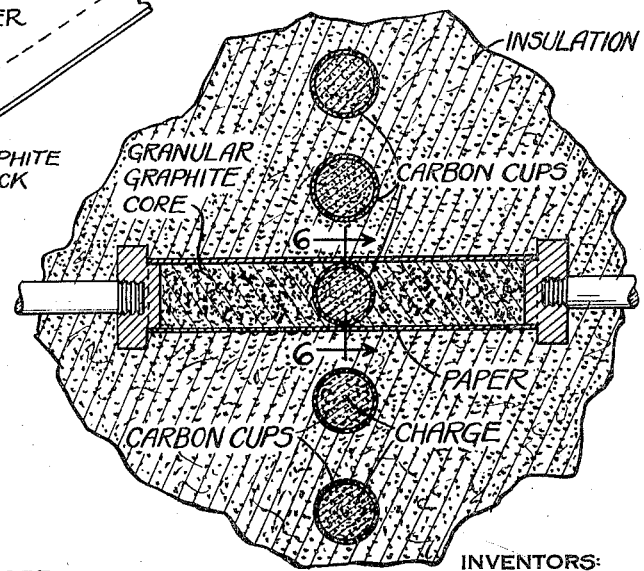
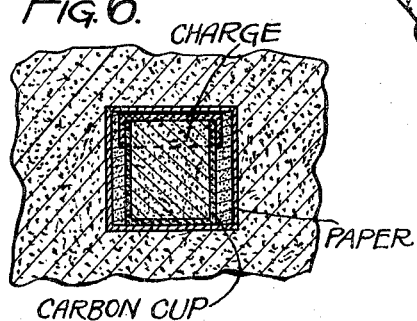
INVENTORS:
CHARLES J. KINZIE
DONALD S. HAKE
BY
ATTORNEY Patented Mar. 8, 1938

2,110,733

UNITED STATES PATENT OFFICE 2,110,733

PREPARATION OF A ZIRCONIUM OXYCARBIDE AND SILICON CARBIDE

Charles J. Kinzie and Donald S. Hake, Niagara Falls, N. Y., assignors to The Titanium Alloy Manufacturing Company, New York, N. Y., a corporation of Maine Application March 1, 1934, Serial No. 713,536

7 Claims. (Cl. 23—16)

Our invention relates to the production of compounds of zirconium and titanium, more particularly those of zirconium, in the electric resistance furnace with the incidental production of silicon carbide as a by-product.

Our invention consists primarily in the discovery that from natural zircon ($ZrSiO_4$), an essentially silicon-free compound of zirconium may be made, while at the same time volatilizing part of the iron and other impurities contained in the zircon. While accomplishing this result, there is also formed in the same furnace a substantial yield of silicon carbide, part of which is the product of the silicon volatilized from the zircon, and part is produced in the insulating mix consisting preferably of petroleum coke, silica sand and sawdust by the absorption of waste heat from the zirconium reaction zone or inner zone of the furnace.

As regards the elimination of silicon compounds from the zircon, our method is novel and exceptionally advantageous in that the zirconium silicate is completely dissociated without any apparent fusion, the silicon compounds being volatilized so as to leave the zirconium behind in the form of a relatively fine, dark-colored zirconium compound in powdered form which may contain a small amount of silicon as carbide (SiC), which, as will be hereinafter described may later be separated from the zirconium compound by mechanical separation.

This dark-colored zirconium compound powder is, we believe, a new product, and also the zirconium oxide resulting from its subsequent calcination possesses a number of properties not hitherto associated with zirconium oxides.

As regards the elimination of silicon from zircon, our methods have the advantage over all prior methods, due to the fact that all or practically all of the silicon may be readily eliminated, while the only prior method at all satisfactory, which is disclosed in U. S. Patent No. 1,342,084 of June 1, 1920 to Barton, yielded a zirconium cyanonitride product.

This zirconium cyanonitride is a dense fused mass, and, as actually produced in commercial practice when following the process as described by Barton and using zircon of the same composition as will be hereinafter presented under "Example A", has approximately the following composition:

|  |  | Per cent |
|---|---|---|
| Zirconium | about | 83.0 |
| Titanium | do | 0.13 |
| Silicon | do | 2.5 |
| Iron | do | 0.2 |
| Carbon | do | 4.0 |
| Nitrogen | do | 9.8 |

Such zirconium cyanonitride product of the Barton patent contains some silicon carbide which cannot be removed readily except by chemical means, because in such cyanonitride the silicon carbide is closely held in the fused mass; if the cyanonitride is burned in air to form zirconium oxide, the particles of zirconium oxide in the main are coarse, and since those of the silicon carbide are of similar size range, no mechanical separation is feasible.

In our novel zirconium compound any silicon carbide remaining or getting into it from adjacent silicon carbide zones of furnace may be readily separated, due to the extremely fine particle size of such zirconium compound product, particularly the oxide of zirconium produced by ignition of this zirconium product.

Since this zirconium product is in an extremely finely-divided condition, it may be separated from the relatively small amount of silicon carbide by a simple sieving operation, since the zirconium product passes through and leaves the silicon carbide, etc. on the sieve.

These products, namely a dark-colored free-flowing zirconium compound as well as the practically colorless $ZrO_2$ resulting from subsequent oxidation of same, possess the following characteristics which distinguish same from prior products.

First as to the dark colored zirconium compound furnace product prior to oxidation and after sieving to remove silicon carbide and other coarse material. In form and color it is a black powder consisting of opaque grains or aggregates mainly 0.005 mm. to about 0.02 mm. in size as discharged from the furnace. Evidently no silicon compound is left associated with the zirconium product since the small amount of silicon as SiC exists mechanically free of the zirconium compound from which it was separated by sieving. Such black powder has approximately the following chemical analysis:

|  | Per cent |
|---|---|
| Zirconium | 70.0 |
| Carbon | 4.0 |
| Silicon carbide | Nil |
| Silicon | Nil |
| Iron | 0.05 |
| Titanium | 0.11 |
| Others (mostly oxygen) | 25.84 |
|  | 100.00 |

The black powder being optically opaque, it was not possible to identify its optical characteristics.

Second as to the zirconium oxide. When this black powder is heated in air to a temperature of about 600° C., it glows and is converted to zirconium oxide. A remarkable expansion in volume takes place; one volume of black powder increases to about three volumes of zirconium oxide, while one part by weight of black powder produces 0.96 part by weight of zirconium oxide product.

Such zirconium oxide obtained by calcination of the black powder has approximately the following chemical analysis:—

|  | Per cent |
|---|---|
| $ZrO_2$+small amounts others | 99.74 |
| Silica | Nil |
| $TiO_2$ | 0.18 |
| $Fe_2O_3$ | 0.08 |
|  | 100.00 |

It is a colorless fine powder consisting of zirconium oxide materials, the preponderating constituent being too fine to be resolved microscopically. The particles average less than 0.005 mm. in size and probably are of 0.001 mm. or finer. The aggregate refractive index is between 1.91 to 2.04, which identifies this product as substantially different as compared with prior $ZrO_2$ products which have higher refractive indices. The calcined material appears to be in the form of a glass (presumably vitreous $ZrO_2$), in which very minute crystals of $ZrO_2$ appear to have been formed suddenly.

The zirconium compound in black powder form is evidently not zirconium carbide, and is probably a zirconium oxycarbide or zirconium carboxide which may have the formula $2(ZrO_2).C$, or more likely $ZrO.C$.

As contrasted with this $ZrO_2$ product as made by our process, the zirconium cyanonitride of the Barton patented process upon calcining one part by weight became about 1.20 parts by weight, while the volume increased about 2½ times. The $ZrO_2$ particles produced range in size from 0.001 mm. to 0.20 mm. with the average size of crystals about 0.09 mm. The zirconium oxide is crystalline, and not vitreous or non-crystalline.

In a companion case filed by us March 1st, 1934, Serial No. 713,537, and which has matured into Patent No. 2,072,889 of March 9, 1937, pure crystalline $ZrO_2$ is produced and thus the products of this case (zirconium carboxide) and its resultant zirconium oxide are clearly different as compared with Barton as well as with that set forth in our companion case.

We understand that by chemical processes (solution and precipitation, etc.) fine crystalline $ZrO_2$ products have been formed, but such products to our knowledge are crystalline in form, and possess no semblance of a glassy or vitreous character.

Therefore we believe that these very fine vitreous or glass like particles containing even more minute crystals of $ZrO_2$ (incipiently formed in the $ZrO_2$ glass), the whole having a mean index of refraction of 1.91 to 2.04 constitutes a new and useful product in the arts.

This index of refraction is low for any hitherto known form of $ZrO_2$ which additionally serves to distinguish it from prior products as well as from the product of our companion case. The product of this case, although practically as pure as the product of our companion case, is entirely different in all its physical characteristics, even though it contains more iron as compared with the product of our companion case.

In practicing our invention as shown in the accompanying drawings to illustrate our methods, we build up a hearth of suitable material, preferably of common firebrick, to serve as a supporting base for the furnace and its charge, the base having side and end walls to retain the charge. Through each of the end walls there is a suitable opening for the placing of the graphite electrode, while all or part of the side wall of the furnace is built up of loose bricks to allow the free escape of evolved gases, and to also allow dumping of the insulating material used around the charge. The bottom of the furnace is preferably supported on piers to allow ample space for air to circulate, and the bottom should not be too tight, only tight enough to retain charge insulation. There should be cracks or small openings in the bottom to allow the ready escape of evolved gases.

Of the drawings showing different types of electric furnaces, Fig. 1 is a sectional elevation showing one type of furnace;

Fig. 2 is a section taken on the line 2—2 of Fig. 1;

Fig. 3 is a section taken on the line 3—3 of Fig. 1;

Fig. 4 is an enlarged perspective view of the granular graphite resistor partly broken away;

Fig. 5 is a fragmentary horizontal sectional view of a modified form of furnace;

Fig. 6 is a detail enlarged sectional view on the line 6—6 of Fig. 5; and

Fig. 7 is a view, partly in section, of a modified resistance core used in Example B.

*Example A.*—The following complete example will serve to show how our methods may be used to produce our new zirconium compound and a by-product of silicon carbide (SiC). The furnace as shown in the accompanying drawings was loaded in the following manner.

An insulating mix is first prepared by mixing the following materials:

|  | Parts by weight |
|---|---|
| Green petroleum coke | 37 |
| Silica sand | 55 |
| Wood sawdust | 8 |
|  | 100 |

This mixture is charged upon the hearth of the furnace to a depth of about ten inches and leveled off and in center over an area of about fifteen inches by six inches a piece of thin tough paper was placed.

The graphite electrodes consist preferably of round, one inch by twenty-six inch long pieces, one through each end wall, the exterior ends being suitably connected to the source of current, while the ends within the furnace are brought to within twelve inches of each other, leaving this twelve inch space for the placing of granular graphite resistor. At each end of round graphite electrodes, each one inch in diameter, is a three inch by three inch by one inch block of graphite to confine the zones of various materials.

Outside the furnace the ends of the graphite electrodes may be cooled by passing a current of water through them as shown in Figs. 1 and 2.

Sheets of thin tough paper were then placed so as to form a zone one inch wide by three inches high between electrodes and into this space granular graphite one-eighth inch mesh was placed.

Then sheets of thin tough paper were arranged, one on each side, one inch away from the sheets confining the granular graphite core, and into these two spaces as so formed a charge was placed consisting of

| | Grams |
|---|---|
| Zirconium silicate ---------- —35 mesh__ | 6,854 |
| Green petroleum coke ------------------ | 1,500 |
| Wood sawdust ------------------------- | 334 |
| Total -------------------------------- | 8,688 |

The zircon sand referred to in the above charge contained:—

| | Percent |
|---|---|
| Zirconium silicate ($ZrSiO_4$) ----------- | 97.00 |
| Iron impurity (calculated as $Fe_2O_3$) ------ | 0.15 |
| Titanium impurity (calculated as $TiO_2$) __ | 0.20 |
| Balance free $SiO_2$ and other materials____ | 2.65 |
| | 100.00 |

Sheets of thin tough paper were then arranged on each side one inch away from sheets confining the zircon coke and sawdust charge, and the spaces thus formed were filled with green petroleum coke as shown in Figs. 2 and 4.

A piece of thin paper was then placed over the charge, and the entire remaining space in the furnace was thereafter filled with the mixture of coke, sand and sawdust as shown (Figs. 1 and 3).

As shown in Figs. 1 and 2, the graphite electrodes extend in through furnace wall, and are connected outside with a suitable source of electric power and are connected inside with a one inch wide by three inches high by twelve inches zone of granular graphite. At each side of this granular graphite core is a zone of zircon, sand and coke mixture twelve inches long, one inch wide and three inches high, and a zone of green petroleum coke three inches high by twelve long is located outside the zone containing the charge. The granular graphite core and the zircon coke mixture are as a whole temporarily separated from the insulating mix at the bottom, sides and top by layers of paper, and at the ends by the contact blocks of graphite and by paper (Figs. 2-4).

The charge as so formed is completely surrounded at the bottom, sides, top and ends with approximately twelve inch zones of this insulating charge. The source of power for this example was a laboratory transformer 12 K. V. A. with a secondary voltage range of 2 to 45 volts in steps of 2 volts. A voltmeter and an ammeter were connected and used to measure terminal voltage and secondary current. The current was turned on and the run was of 6½ hours duration, using from 30 to 42½ secondary voltage and an average of about 280 amperes.

As the run progressed, the carbon monoxide gas evolved was ignited at various points at the sides, ends and bottom of the furnace. The exterior of the furnace bottom hearth, side walls, or top of the insulating mix were never much above room temperature, since the heat developed at these points as the result of the burning of carbon monoxide or other gases purposely ignited from the outside as small flames so as to convert same into harmless gases is not enough to have much effect in raising the temperature of the exterior of the furnace.

After 6½ hours, the current was turned off, and the furnace and its charge was allowed to cool for about 72 hours.

The top and side insulation were then removed so as to expose an envelope or shell of greenish colored crystals, which upon analysis proved to consist mainly of crystals of silicon carbide (SiC), a well-known abrasive and refractory material. Upon removal of the upper part of this outer shell of silicon carbide, we found in the zones originally occupied by the zircon, coke sawdust mix, a black powder the composition and properties of which have hereinbefore been described in detail.

Upon ignition this black powder is converted into zirconium oxide possessing properties as heretofore described.

Both the black powder as well as the zirconium oxide resulting from its ignition are new and useful zirconium products.

This Example A shows that by means of our improved methods a pure zirconium oxide may be produced directly from $ZrSiO_4$, and that the silicon evolved has been converted to the useful silicon carbide, while the heat, after accomplishing its major function, has been effectively used to form additional silicon carbide from the inner zones of insulating mix.

We do not wish to confine our methods of charging to that specifically described in foregoing example. For example, the zircon, coke sawdust mixture may be placed below and above the core of granular graphite.

The zircon coke mixture may also be placed in suitable containers such as paper or cardboard cartridges which are arranged adjacent the core or within the core, and are then surrounded with the insulating mix. Graphite or carbon containers may likewise be used to hold the zircon charge, and may be readily removed and discharged after the reaction is over and the charge cooled.

In case this black zirconium compound powder is to be converted to $ZrO_2$, the later ignition step may be avoided and economy effected by allowing the charge to cool down to about 800° C., and then removing the black powder, charging same onto a suitable hearth and then allowing it to ignite mainly or entirely by its own heat.

The method of charging should be such as to allow a ready escape of the silicon from the zircon so as to form a coherent envelope or shell of silicon carbide from which the zirconium material may be separated. We do not wish to confine ourselves to the use of granular graphite or carbon as the core material; any suitable resistor material, such as graphite or carbon rods or mixture of same with granular graphite, may be used as the resistor with satisfactory results.

In our examples, we do not confine our improved methods necessarily to the use of the insulating mix of coke, sand and sawdust. There could also be used other mixtures, such as zircon and coke and sawdust, but in this case the formation of the by-product SiC would be lower. Hence we prefer to use the lower priced insulating mix of coke, sand and sawdust, and so obtain as high a yield of silicon carbide as can be produced and to limit the use of the more expensive raw materials in so far as possible. In place of petroleum coke there may be used other forms of carbon, such as coal, calcined coal or foundry coke.

In place of the relatively pure zircon referred to in Example A there may also be used crude zircon as well as zirconium ores containing both zircon and zirconium oxide, and if desired zirconium oxide alone. In case these crude materials are used, the resulting product will contain certain impurities such as titanium, and consequently the final product, although purified of silicon and iron compounds, will still contain considerable titanium.

*Example B.*—We have also produced titanium carbide (TiC) from a mixture of rutile (TiO$_2$) and carbon as well as silicon carbide by the waste heat. The construction of the resistance graphite core in this case was as shown in Fig. 7. By means of restricting the core area a more intense heat was produced and enabled us to produce a very pure coherent titanium carbide; while silicon carbide was produced in the insulating mix adjacent to the core.

A charge was made up using 22 parts green petroleum coke, 45 parts rutile and 6 parts sawdust (all parts by weight).

The insulating mix was placed in bottom of furnace, the inside end blocks on graphite electrodes were brought within 8 inches of each other, and a core built up of granular graphite by using coarser graphite at the ends than in the centre portion.

In the centre of the core the charge was placed, and above and below this area was placed a ¼ inch layer of 200 mesh graphite powder to permit the current to pass above and below the charge. The furnace was now filled with the insulating mix of silica sand, coke and sawdust, and the current was then turned on.

The run was of three hours' duration and maximum of 280 amperes being the input. The furnace was then allowed to cool.

A small amount of melted coherent titanium carbide was formed having the following analysis:—

|   | Per cent |
|---|---|
| Titanium (calculated as Ti) | 78.75 |
| Silicon (calculated as Si) | 0.72 |
| Iron (calculated as Fe) | 0.20 |
| Carbon (C) | 19.82 |
| Balance aluminum, etc | 0.51 |
|   | 100.00 |

It will be observed that this product corresponds to the formula of TiC, and we found this product to be exceptionally pure.

By comparing the composition of above product with the following analysis of rutile which we used, it will be apparent that the silicon and iron content were materially reduced, and that the oxygen has been eliminated.

*Analysis of rutile used*

|   | Per cent |
|---|---|
| Ti | 56.04 |
| Si | 0.97 |
| Fe | 1.23 |
| Al | 0.37 |
| P | 0.26 |
| Ca | 1.25 |
| O | 39.88 |
|   | 100.00 |

*Example C.*—We have also produced titanium carbide directly from ilmenite, and in same operation the by-product silicon carbide. The ilmenite used had approximately the following analysis:—

|   | Per cent |
|---|---|
| Ti | 32.00 |
| Fe | 31.30 |
| Si | 0.75 |
| Al | 0.74 |
| Others mainly oxygen | 35.21 |
|   | 100.00 |

The charge consisted of 1000 grams ilmenite sand—60 mesh and 367 grams green petroleum coke—60 mesh. The charge was well mixed and placed in five carbon cups as shown in Figs. 5 and 6, 2 inches in diameter by 2½ inches high and covered with a carbon cover. In loading the furnace one cup was placed in the granular graphite core (Fig. 5). Two cups were also placed, one at each side of core, 1½ inches away, and the other two were placed one on either side still farther away, or about 3 inches away, all as shown in diagrammatic form in Fig. 5. The whole was then covered, sides, ends and top with about 12 inch thickness of the sand, petroleum coke, sawdust mix. The run was of 8 hours' duration using from 29 to 45 volts with a maximum of about 275 amperes; the furnace was then cooled and opened.

The center cup in the core which, of course, was the one at the highest temperature contained a metallic button having the following analysis:—

|   | Per cent |
|---|---|
| Titanium (calculated as Ti) | 49.50 |
| Silicon (calculated as Si) | 1.48 |
| Iron (calculated as Fe) | 31.55 |
| Carbon (C) | 14.80 |
| Others | 2.67 |
|   | 100.00 |

A specimen of the melt from this center cup was extracted with hot 5% H$_2$SO$_4$ to remove the iron, and there remained a residue of titanium carbide of the following analysis:—

|   | Per cent |
|---|---|
| Titanium (calculated as Ti) | 73.65 |
| Silicon (calculated as Si) | 1.70 |
| Iron (calculated as Fe) | 0.74 |
| Carbon (C) | 19.94 |
| Others | 3.97 |
|   | 100.00 |

The product from the center cup is a fairly pure titanium carbide.

The product in the two cups close to the core but outside same consisted of a sintered product which after extraction with hot acid yielded a residue containing—

|   | Per cent |
|---|---|
| Titanium (calculated as Ti) | 60.75 |
| Silicon (calculated as Si) | 1.11 |
| Iron (calculated as Fe) | 8.21 |
| Carbon (C) | 15.38 |
| Others (including oxygen) | 14.55 |
|   | 100.00 |

The product from the outermost cups after similar treatment contained—

|   | Per cent |
|---|---|
| Titanium (calculated as Ti) | 33.75 |
| Silicon (calculated at Si) | 0.21 |
| Iron (calculated as Fe) | 10.45 |
| Carbon (C) | 27.78 |
| Others (mostly oxygen) | 27.81 |
|   | 100.00 |

The results with the cups in the outermost zones show that reduction was not complete, but serves to show that by this method either a titanium concentrate or the titanium carbide may be produced from ilmenite, and additionally silicon carbide was also produced from the waste heat.

In the various examples given, we have shown how new zirconium compounds and carbides of titanium may be made in the resistance type electric furnace, while using the waste heat in producing silicon carbide.

Our improved methods need not be confined necessarily to the examples mentioned, since other carbides which are stable and producible at the temperatures involved might be likewise formed while producing during the same operation the useful silicon carbide.

Our methods are a marked advance over the electric arc furnace method for treating zirconium and titanium minerals. In the latter there is a fume and dust problem as well as enormous loss of energy in the form of heat and loss of valuable material as well, while in our novel methods the high temperatures are obtained and useful compounds are produced with little loss of energy and practically no material loss and without dust evolution of any kind; during the furnace operation no external heat problem and no dust problem are involved.

Our methods are, therefore, a marked advance in the production of old compounds, such as, titanium carbide, and additionally produce the new zirconium black powder compound and a novel $ZrO_2$ product as has been described, and that by using the waste heat from these reactions to form silicon carbide, the latter is made available with economies hitherto not contemplated.

In industrial practice the insulating mixture would be used over and over again, enriching it in any of its ingredients as may become deficient and also keeping the mix sufficiently porous by occasionally renewing the sawdust.

While it is difficult to determine accurately the temperatures attained in the furnace, it is quite likely that temperatures must be in excess of about 2000° C. where the zircon is decomposed and silicon volatilized. If as may be the case in Example A, the silicon carbide is first formed within the zirconium charge and later volatilized and reformed outside the charge, the temperatures must be in excess of 2200° C.

Much higher temperatures can be attained by varying the structure and size of resistance core as well as by varying the power input.

In the foregoing specification we have set forth how new zirconium products may be readily made from zirconium silicate without resort to fluxes or chemical treatment of any kind. At no stage in our methods does the zircon pass into a solution, and at no stage is it fluxed with alkali or other material; by this simplified dry treatment, the silicon is entirely eliminated either in the furnace or later by sieving the powder to free it of silicon carbide or other undesired materials, such as the small amounts of coarsely crystalline $ZrO_2$ which at times may be formed.

X-ray films of our calcined zirconium oxide product show that in the diffraction pattern our zirconium oxide gave broad $ZrO_2$ lines showing the presence of $ZrO_2$ particles too small to be seen clearly with the microscope. Hence we believe that this zirconium oxide product which we have heretofore described consists of a mixture of minute crystals of $ZrO_2$ in glass. As the analysis shows chiefly $ZrO_2$ then the glass in which minute $ZrO_2$ crystals have formed is a substantially pure $ZrO_2$ glass or vitreous $ZrO_2$.

We have also set forth how our improved methods may be adapted to the formation of titanium carbide from rutile and to production of titanium carbide from ilmenite, while making use of the heat surplusage to form silicon carbide in the adjacent surrounding insulating mix.

We have also described how, while accomplishing the above dual effects, a third process may be simultaneously conducted with the production of titanium concentrates from ilmenite in the outer and lower temperature zones of the furnace, all of which several operations involving heat may be advantageously accomplished at the same time by suitable arrangement of the charges within a single furnace that is fired at one time.

We claim as our invention:—

1. The method of converting zircon, containing compounds of iron as an impurity, into a zirconium compound essentially free of silicon and iron, which comprises heating without fusion but with substantial decomposition said zircon mixed with a carbonaceous material and enveloped in a carbonaceous reducing agent, in an electric resistance furnace to produce said zirconium compound in dark-colored finely powdered form and also silicon carbide mixed therewith, and then separating the silicon carbide from the zirconium compound so produced.

2. The method of converting zircon, containing compounds of iron as an impurity, into a zirconium compound essentially free of silicon and iron, which comprises heating without fusion but with substantial decomposition said zircon mixed with a carbonaceous material and enveloped in an insulating mix containing coke, sand and sawdust, in an electric resistance furnace to produce said zirconium compound in dark-colored finely powdered form and also silicon carbide mixed therewith, and then separating the silicon carbide from the zirconium compound so produced.

3. The method of converting zircon, containing compounds of iron and titanium as impurities, into a zirconium compound essentially free from silicon, titanium, iron and also silicon carbide, which comprises heating without fusion but with substantial decomposition said zircon mixed with a carbonaceous material and enveloped in a carbonaceous insulating mix, in an electric resistance furnace to form a powdered mass consisting of said zirconium compound and said silicon carbide, and mechanically separating the silicon carbide therefrom.

4. The method of converting zircon, containing componds of iron and titanium as impurities, into a zirconium compound essentially free from silicon, titanium, iron and also silicon carbide, which comprises heating without fusion but with substantial decomposition said zircon mixed with a carbonaceous material and enveloped in a carbonaceous insulating mix containing petroleum coke, silica sand and sawdust, in an electric resistance furnace to form a powdered mass consisting of said zirconium compound and said silicon carbide, and mechanically separating the silicon carbide therefrom.

5. The method of converting zircon, containing compounds of iron and titanium as impurities, mixed with carbon-containing material into a zirconium compound essentially free of silicon, titanium and iron but mixed with silicon carbide, which comprises heating without fusion but with substantial decomposition said charge enveloped in a carbonaceous insulating mix, in an electric resistance furnace to form a dark-colored powdered zirconium compound containing a relatively small amount of said silicon carbide.

6. The method of producing a zirconium carboxide essentially free from silicon, titanium, iron and silicon carbide from zirconium silicate, containing compounds of iron and titanium as impurities, which comprises heating without fusion but with substantial decomposition said silicate mixed with a carbonaceous material and enveloped in an insulating mix containing coke, silica sand and sawdust, in an electric resistance furnace to form said zirconium carboxide and silicon carbide in a powdered mass, and mechanically separating said powdered mass to obtain said zirconium carboxide.

7. A zirconium compound containing zirconium, carbon and oxygen and probably having the structural formula (ZrO.C) obtained by high temperature decomposition without fusion of zircon, containing compounds of iron and titanium as impurities, mixed with a carbonaceous material, said compound being characterized as an opaque black powder of particle size from 0.005 to 0.03 mm., substantially free of silicon and iron, and with less than ½ of 1% of titanium as an impurity.

CHARLES J. KINZIE.
DONALD S. HAKE.